United States Patent
Mantha

(10) Patent No.: US 8,085,739 B2
(45) Date of Patent: *Dec. 27, 2011

(54) QUALITY DEPENDENT DATA COMMUNICATIONS CHANNEL

(75) Inventor: Ramesh Mantha, Toronto (CA)

(73) Assignee: Wi-LAN, Inc. (CA)

( * ) Notice: Subject to any disclaimer, the term of this patent is extended or adjusted under 35 U.S.C. 154(b) by 919 days.

This patent is subject to a terminal disclaimer.

(21) Appl. No.: 12/059,297

(22) Filed: Mar. 31, 2008

(65) Prior Publication Data

US 2008/0192676 A1 Aug. 14, 2008

Related U.S. Application Data

(63) Continuation of application No. 10/296,497, filed as application No. PCT/CA01/00705 on May 16, 2001, now Pat. No. 7,362,735.

(30) Foreign Application Priority Data

May 25, 2000 (CA) ........................ 2309472
Apr. 30, 2001 (CA) ........................ 2345507

(51) Int. Cl.
*H04J 3/00* (2006.01)
*H04J 3/26* (2006.01)

(52) U.S. Cl. ........................ 370/337; 370/432

(58) Field of Classification Search .................. None
See application file for complete search history.

(56) References Cited

U.S. PATENT DOCUMENTS

| | | | |
|---|---|---|---|
| 5,548,598 A | 8/1996 | Dupont | |
| 5,930,230 A | 7/1999 | Odenwalder et al. | |
| 5,949,814 A | 9/1999 | Odenwalder et al. | |
| 6,263,466 B1 | 7/2001 | Hinedi et al. | |
| 6,407,993 B1 | 6/2002 | Moulsley | |
| 6,442,145 B1 | 8/2002 | De Lange et al. | |
| 6,567,475 B1 | 5/2003 | Dent et al. | |
| 6,574,202 B1 * | 6/2003 | Himayat et al. | 370/329 |
| 6,931,077 B2 | 8/2005 | Aizawa et al. | |
| 7,050,407 B1 | 5/2006 | Frazer et al. | |
| 2001/0055298 A1 | 12/2001 | Baker et al. | |

FOREIGN PATENT DOCUMENTS

| | | |
|---|---|---|
| EP | 0 848 515 A2 | 6/1998 |
| WO | 97/25788 A1 | 7/1997 |
| WO | 98/51111 A1 | 3/1998 |
| WO | 99/21287 A1 | 4/1999 |

* cited by examiner

*Primary Examiner* — Hassan Phillips
*Assistant Examiner* — Hicham Foud
(74) *Attorney, Agent, or Firm* — Procopio, Cory, Hargreaves & Savitch LLP

(57) ABSTRACT

A data channel to transmit data from a transmitter to one or more of a plurality of receivers, each of which intermittently reports to the transmitter its reception quality of signals transmitted by the transmitter. The transmitter transmits the data in frames which include at least one block. Each block includes the same predefined number of traffic symbols, and includes a header portion and a payload portion. The header portion of each block is packaged for transmission in a robust manner, enhancing the probability that each receiver will be able to recover it and the header portion includes information required to recover the payload portion. The payload portion is, in accordance with the reception quality reported by the intended receiver, packaged to make efficient use of the transmission resources while ensuring a reasonable probability that the intended receiver will be able to recover the payload. The header portion can include indications of the modulation, forward error correction and repetition utilized to package the payload and can indicate the length of the payload.

14 Claims, 3 Drawing Sheets

QUALITY DEPENDENT DATA COMMUNICATIONS CHANNEL

The present application is a continuation of U.S. patent application Ser. No. 10/296,497, filed May 12, 2003, which issued as U.S. Pat. No. 7,362,735 on Apr. 22, 2008, and which claims priority under 35 U.S.C. §365(b) to International (PCT) Application No. PCT/CA01/00705, filed May 16, 2001, the entire contents of which are hereby incorporated herein by reference.

FIELD OF THE INVENTION

The present invention relates generally to a method and system for transmitting data from a radio transmitter to a receiver. More specifically, the present invention relates to a method and system for transmitting data between stations, such as the radio base station and subscriber stations in a wireless local loop (WLL) system, or the like, where the receivers experience different reception qualities and the data transmission is packaged correspondingly.

BACKGROUND OF THE INVENTION

Wireless communication has undergone tremendous development and growth in the last few decades. Current digital wireless telephone networks based on multiple access techniques such as CDMA, FDMA or TDMA can offer high quality voice communications. However, these networks are not efficient at offering data communications when a number of users must be serviced, and a sharp increase in demand for data communications over wireless networks is expected.

For example, the IS-95 standard for CDMA networks can offer a maximum data rate of 9.6 kilobits per second (kbps) or 14.4 kbps depending on the selected service. As known to those of skill in the art, however, these rates are generally too slow to meaningfully accommodate modern data applications, such as web-browsing, streaming media and/or file transfer. Attempts have been made to increase the maximum data rate within IS-95. For example, U.S. Pat. No. 5,930,230 to Odenwalder teaches a high data rate CDMA wireless communication system that offers certain improvements over IS-95. However, Odenwalder is directed to the CDMA environment, and primarily concentrates the transfer of data from subscriber stations to base stations, (typically referred to as the "uplink" or "reverse" channel) and thus does not address the need for increased transmission of data from base stations to subscriber stations (typically referred to as the "downlink" or "forward" channel).

Another difficulty exists with IS-95 type networks in that they assign a dedicated communication channel between the base station and a subscriber unit and therefore the bandwidth of the dedicated channel is unavailable to other users in the network, even when no data is being transmitted between the base station and the subscriber unit. Thus, for connectionless services such as Internet Protocol (IP) networks, such a system does not typically provide effective use of limited shared bandwidth, which is a necessity for servicing large numbers of users.

Further, the characteristics of the data transmission typically are independent of the reception levels experienced at the receiver. Thus, the transmission characteristics are set to a lowest common denominator which is selected to ensure reception under worst case, or near worst case, conditions and is held constant for all transmissions. While this allows for simple system design and operation, it does not make efficient use of bandwidth or other system resources.

U.S. Pat. No. 5,949,814, also to Odenwalder ("Odenwalder #2"), teaches a system which provides a high data rate supplemental channel for CDMA telecommunications systems. In this scheme, the transmission system includes an in-phase channel set and a quadrature-phase channel set. The in-phase channel set provides a set of orthogonal medium rate control and traffic channels and the quadrature-phase channel set provides the high-rate supplemental channel and an extended set of medium-rate channels that are orthogonal with respect to each other.

While Odenwalder #2 can increase the downlink data transmission rate, it is not generally suitable for transmitting data to multiple subscriber stations, which have different abilities to receive the transmission. Further, Odenwalder #2 requires certain overhead control communication between the base station and the mobile user in order to commence a high data rate communication therebetween. Such a system is not well suited to systems such as packet-based communication systems where small amounts of data may need to be transferred to users as the necessary overhead can make the communication inefficient relative to the amount of data transferred. Similarly, such a system is not well suited to situations wherein a variety of users need data transmitted to them.

SUMMARY OF THE INVENTION

It is an object of the present invention to provide a novel method, system and apparatus for transmitting data between stations, which obviates or mitigates at least one of the above-identified disadvantages of the prior art.

According to one aspect of the invention, there is provided a system for transmitting data comprising: a plurality of subscriber stations operable to receive a signal from a base station at a different reception-quality than at least one other subscriber station; and a base station operable to transmit a radio signal to said subscriber stations, the signal including a frame having a fixed duration and comprising at least one block of data, each block including a header packaged by said base station to be recoverable by all of the subscriber stations regardless of their specific reception-qualities, and a payload portion packaged by said base station to be recoverable by at least the intended recipient subscriber station.

According to another aspect of the invention, there is provided a block for transmission to one of a plurality of subscriber stations each having a reception-quality corresponding to an ability to recover the transmission, the block comprising a payload and a header, the header packaged for recovery regardless of the reception-qualities of the subscriber stations and including information required to recover the payload, the payload being packaged to make efficient use of transmission resources and to enhance reception by an intended receiving subscriber station according to the reception-quality experienced by that subscriber station.

BRIEF DESCRIPTION OF THE DRAWINGS

Preferred embodiments of the present invention will now be described, by way of example only, with reference to the attached Figures, in which:

FIG. 5 is a schematic representation of a block in the frames of FIG. 4a.

DETAILED DESCRIPTION OF THE INVENTION

Figure 1:
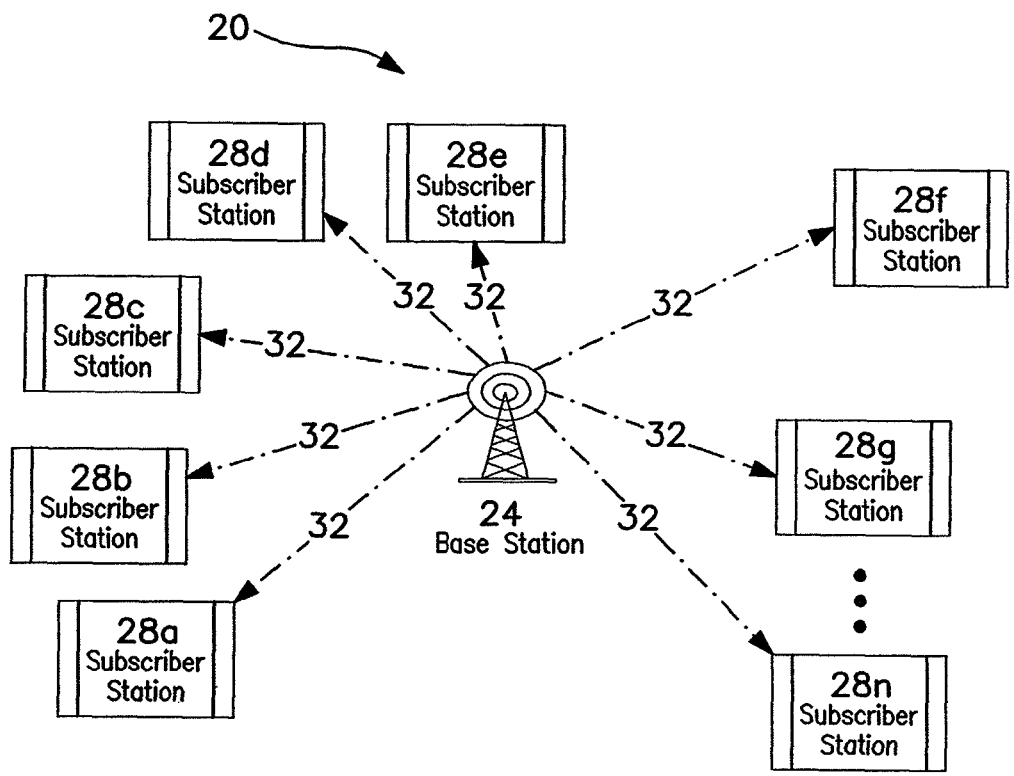
FIG. 1 is a schematic representation of a network incorporating a data channel in accordance with an embodiment of the invention.

Referring now to FIG. 1, a wireless network system for transmitting data is indicated generally at 20. System 20 includes a radio base station 24 and a plurality of subscriber stations 28a, 28b . . . 28n. In a presently preferred embodiment, radio base station 24 is connected to at least one data telecommunications network (not shown), such as a land line-based switched data network, a packet network, etc., by an appropriate gateway and one or more backhauls (not shown), such as a T1, T3, E1, E3, OC3 or other suitable land line link, or can be a satellite or other radio or microwave channel link or any other link suitable for operation as a backhaul as will occur to those of skill in the art.

Base station 24 communicates with subscriber stations 28 which, in a present embodiment of the invention, are installed at subscriber premises, as is common in a wireless local loop (WLL) system. The number 'n' of subscriber stations serviced by a base station 24 can vary depending upon the amount of radio bandwidth available and/or the configuration and requirements of the subscriber stations 28.

A data channel 32 is established between base station 24 and each subscriber station 28 via radio. Data channel 32 carries information to be transferred from base station 24 to respective subscriber stations 28a, 28b . . . 28n as needed. Data channel 32 can be implemented with networks using a variety of multiple access techniques, including TDMA, FDMA, CDMA or hybrid systems such as GSM, etc. In a present embodiment, data transmitted over data channel 32 is transmitted as packets encapsulated within frames, the details of which will be discussed in greater detail below.

The ability of a subscriber station 28 to properly receive a signal transmitted to it, hereinafter referred to as the "reception quality" of the signal, can depend upon a variety of factors. Measures of reception quality can be determined in different manners according to the multiple access technique employed to transmit the signal. For example, in TDMA or FDMA systems, the received signal strength is the determination most often used. In CDMA systems, the ratio of received bit power to received interference power (often expressed as $E_s/N_o$, where $E_s$ is energy per symbol, and $N_o$ is the received interference energy) is a relevant determination. In any event, the reception-quality of channel 32 at each subscriber station 28 can vary depending on a variety of factors, including multipath interference (from the presence of nearby buildings, etc.), radio noise sources (including transmissions by other users or radio noise sources), geographical features, the distance of the subscriber station 28 from base station 24, the quality of the receiver in the subscriber station 28, etc., as is well understood by those of skill in the art. With distance, typically a signal attenuates as $$\frac{1}{r^N},$$

where r is the distance between the subscriber station 28 and base station 24, and N>1. In IS-95 CDMA systems, for example, N typically is in the range of 3<N<5.

As illustrated in FIG. 1, the geographic distribution of subscriber stations 28 with respect to base station 24 need not be symmetric nor will subscriber stations which are physically located close to one another necessarily experience the same or similar reception qualities due to a variety of factors including the geographic environment (the presence or absence of buildings which can reflect or mask signals), the radio environment (the presence or absence of radio noise sources), etc. Thus, in most circumstances subscriber stations 28 served by a base station 24 can have significantly different reception qualities and these reception qualities can change over time.

In FIG. 1, at one time subscriber stations 28a and 28f may experience a very good reception quality while subscriber stations 28b and 28g experience moderate reception quality and subscriber stations 28c, 28d and 28e may experience low reception quality. At a subsequent time, subscriber stations 28a, 28d and 28g can have very good reception, subscriber stations 28c, 28e and 28f may experience moderate reception quality and subscriber station 28b may experience low reception quality, etc.

In the present invention, at appropriate intervals or at pre-determined events, each subscriber station 28 will report its present reception-quality to base station 24. Base station 24 operates to maintain a database of the latest reported reception-qualities and appropriately packages data to be transmitted over data channel 32 to each subscriber station 28.

As used herein, the terms "package", "packaged" and "packaging" refer to the overall arrangement of the transmission of the packaged data for its reception at an intended destination receiver. Packaging of data can include, without limitation, applying different levels of forward error correcting (FEC) codes (from no coding to high levels of coding and/or different coding methods), employing various levels of symbol repetition, employing different modulation schemes (4-QAM, 16-QAM, 64-QAM, etc.) and any other techniques or methods for arranging data transmission with a selection of the amount of radio (or other physical layer) resources required, the data rate and probability of transmission errors which are appropriate for the transmission. For example, data can be packaged with rate ¼ FEC coding (each 1 data bit is transmitted in 4 bits of information) and 16-QAM modulation for transmission to a first intended receiver and packaged with rate ½ FEC coding and 64-QAM modulation for transmission to a second intended receiver which has a better reception-quality than the first.

Figure 2:
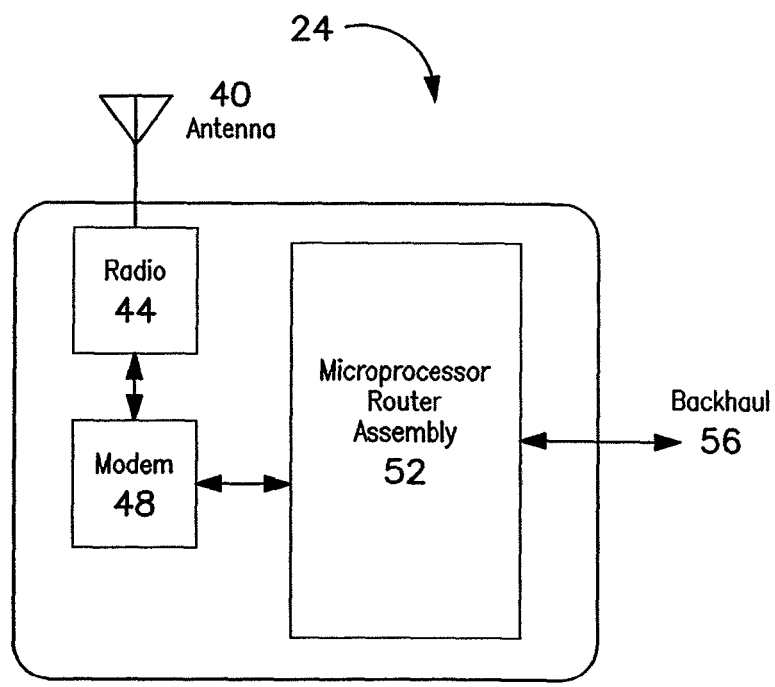
FIG. 2 is a schematic representation of the base station shown in FIG. 1.

FIG. 2 shows an example of base station 24 in greater detail. Base station 24 comprises an antenna 40, or antennas, for receiving and transmitting radio-communications over communication channel 32. In turn, antenna 40 is connected to a radio 44 and a modem 48. Modem 48 is connected to a microprocessor-router assembly 52 such as a SPARC processor system manufactured by SUN Microsystems. It will be understood that assembly 52 can include multiple microprocessors, as desired and/or that the router can be provided as a separate unit, if desired. The router within microprocessor-router assembly 52 is connected to a backhaul 56 in any suitable manner, which in turn connects base station 24 to a data network (not shown).

Figure 3:
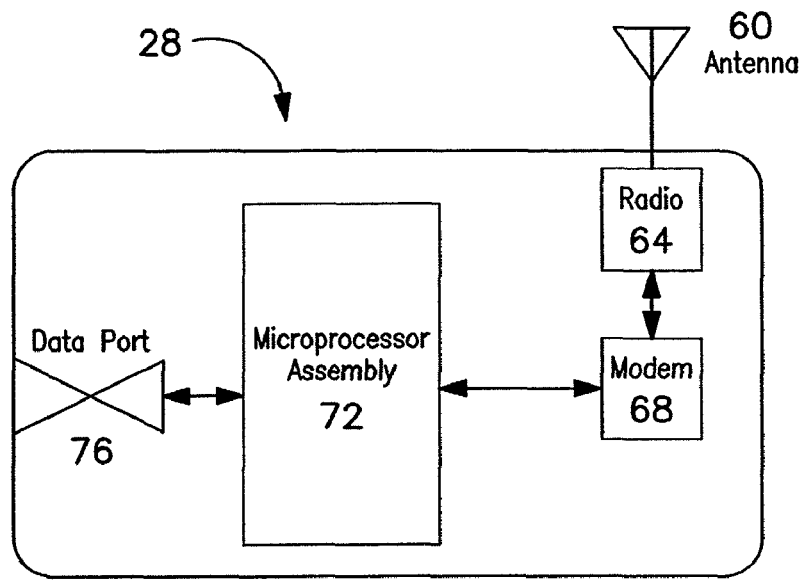
FIG. 3 is a schematic representation of one of the subscriber stations shown in FIG. 1.

Referring now to FIG. 3, an example of a subscriber station 28 is shown in greater detail. Subscriber station 28 comprises an antenna 60, or antennas, for receiving and transmitting radio-communications over communication channel 32. In turn, antenna 60 is connected to a radio 64 and a modem 68, which in turn is connected to a microprocessor-assembly 72.

Microprocessor-assembly 72 can include, for example, a StrongARM processor manufactured by Intel, that performs a variety of functions, including implementing A/D-D/A conversion, filters, encoders, decoders, data compressors, decompressors and/or packet disassembly. As seen in FIG. 3, microprocessor-assembly 72 interconnects modem 68 and a data port 76, for connecting subscriber station 28 to a data client device, such as a personal computer, personal digital assistant or the like which is operable to use data received over communication channel 32. Accordingly, microprocessor-assembly 72 is operable to process data between data port 76 and modem 68.

Figure 4A:
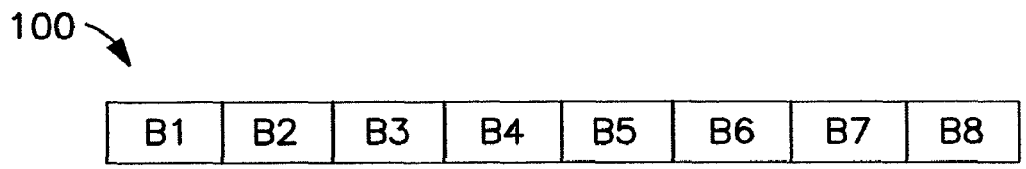
FIGS. 4a, 4b and 4c are schematic representations of a frame of data blocks for transmission over the network shown in FIG. 1 at three different spreading factors.
Figure 4B:
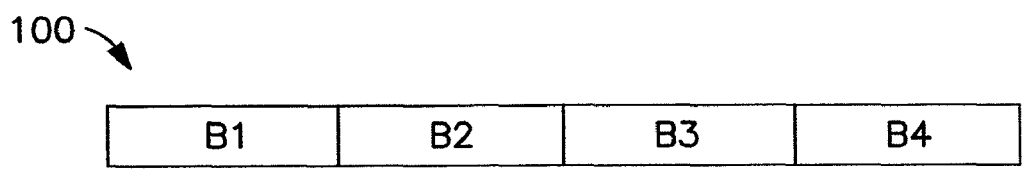
Figure 4C:

Referring now to FIGS. 4a through 4c, a frame for transmission over channel 32 is indicated generally at 100. In a presently preferred embodiment of the invention, data is transmitted over channel 32 in frames 100 which require ten milliseconds of transmission time, although longer or shorter transmission times for frame 100 can be selected if desired.

As understood by those of skill in the art, frame 100 can be measured in terms of a duration of time. In turn, that duration can carry a given number of symbols for transmission. In turn, those symbols can represent data, the actual amount of data being represented by a symbol depending on how the data is packaged into a symbol. In a CDMA embodiment, symbols can be packaged using a combination of the CDMA spreading factor, modulation, repetition and encoding. Thus, it will be appreciated that, while the duration of frame 100 remains constant, the effective amount of data transmitted within a frame will depend on the packaging of the data. The application of these concepts to the present invention will be discussed in greater detail below.

In the present invention, a frame 100 is configured to transmit a number of data blocks $B_1$ through $B_i$, where each block $B_i$ carries a fixed number of traffic symbols and thus the number of blocks in a frame 100 depends upon the CDMA spreading factor, chip rate and the transmission duration of the frame. In a present embodiment of the invention, a CDMA system with a chip rate of three-million, eight-hundred and forty thousand chips per second (3.84 Mcps) is employed and a block $B_i$ with one-thousand two-hundred traffic symbols is employed.

FIG. 4a shows frame 100 employed with a CDMA spreading factor of four, so that eight blocks ($B_1$ through $B_8$) are included in frame 100 and frame 100 thus includes nine-thousand, six-hundred traffic symbols. In FIG. 4b, a CDMA spreading factor of eight is used, so frame 100 includes four blocks ($B_1$ through $B_4$) and four-thousand, eight-hundred traffic symbols and in FIG. 4c, a CDMA spreading factor of 16 is employed, so frame 100 includes two blocks ($B_1$ and $B_2$) for two-thousand, four-hundred traffic symbols. The present inventor has determined that, by maintaining the number of traffic symbols in blocks B constant and the frame duration constant, undesired complexity at modem 68 can be avoided, although it is contemplated that frame structures with different numbers of traffic symbols can be employed, if desired.

Figure 5:
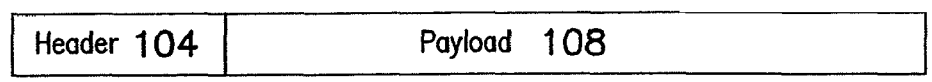

Each block $B_i$ has the structure shown in FIG. 5, including a header 104 and payload 108. It is intended that header 104 be receivable by all subscriber stations 28 in system 20 that have at least a predetermined minimum reception quality. Accordingly, header 104 is packaged in a robust manner to increase the probability that subscriber stations 28 will be able to receive it (i.e.—the frame error rate, or FER, for subscriber stations to receive and understand header 104 is less than a level selected by the operator of system 20). In a present embodiment of the invention, header 104 comprises ten header information bits which are ultimately packaged into one-hundred and twenty traffic symbols by: coding the information bits for forward error correction (FEC) to yield thirty coded bits (a rate ⅓ FEC code); using a repetition factor of eight to repeat the resulting bits for eight repetitions to obtain two-hundred and forty bits; and then modulating those bits using QPSK modulation to yield the one-hundred and twenty traffic symbols of header 104. While this packaging is presently preferred for header 104, it is contemplated that a wide range of other packagings can be employed for header 104, as will be apparent to those of skill in the art.

Of the ten header information bits of header 104, five bits are presently employed to represent a Length value and the remaining five bits to represent a Block Format.

In the present invention, while header 104 is packaged to be receivable by all subscriber stations 28, payload 108 is packaged to provide efficient use of radio channel 32 when transmitting information to an intended recipient subscriber station 28. Accordingly, the modulation, FEC coding; symbol repetitions, etc., of payload 108 will be varied from block B to block B, depending upon the intended recipient subscriber station 28 and its reception quality.

In a present embodiment of the invention, a symbol repetition factor of four, three, two or one can be employed; modulation schemes of 64-QAM; 16-QAM; 4-QAM can be employed; and eight different FEC puncturing masks can be employed (to obtain code rates from ⅓ to ⅘). Further, a length multiplier is required to be available to the receiver so that it can correctly interpret the contents of payload 108 and in a present embodiment of the invention, multiplier values of eight, sixteen, thirty-two, sixty-four and one-hundred and twenty-eight can be employed. Thus, the particular modulation scheme can be represented with two bits of information (to select from four possible modulations); the symbol repetition factor with two bits (to select from four possible repetition rates); the FEC puncture mask with three bits (to select from eight possible puncture masks), the length multiplier with three bits (to select from five possible multiplier values). However, as will be apparent to those of skill in the art, many combinations of these parameters are redundant, contradictory or are unlikely to be useful in system 20. For example, transmissions at 64-QAM modulation with no symbol repetition and low levels of FEC coding are unlikely to be required in system 20.

Accordingly, to reduce the overhead (header 104) required to transmit the payload 108, thirty-two selected combinations, which are deemed most useful, of the modulation, FEC puncture mask, length multiplier and symbol repetition factors are selected and these combinations are defined as entries in a look up table, known to base station 24 and subscriber stations 24 and the entries of which can be accessed by five bits of information which comprise the Block Format. The actual combinations of factors selected for inclusion in the look up table are not particularly limited and it is contemplated that they will be selected by the manufacturer of base stations 24 and subscriber stations 28 in view of the expected range of operating conditions of a system 20.

The remaining five information bits of header 104 represent a Length parameter which, represents the value to be multiplied by the length multiplier from the Block Format, to determine the number of information bits in the payload 108, as this number is necessary for a receiver to know before attempting to interpret payload 108. Essentially, the Length and length multiplier parameters are employed to determine if payload 108 is less than full with valid bits (which can occur depending upon the FEC coding, modulation, and repetition levels used to transmit and the amount of data to be transmitted). As blocks B always have the same number of traffic symbols, pad symbols are added to payload 108 to fill it, if necessary and, to save computational complexity, these pad bits are added after FEC coding, repetition and interleaving has been performed on the payload symbols (as described below). Accordingly, information as to the actual length of payload 108 is required by the receiver to allow for de-interleaving, FEC de-coding, etc., to be performed correctly on the payload 108.

Figure 6:
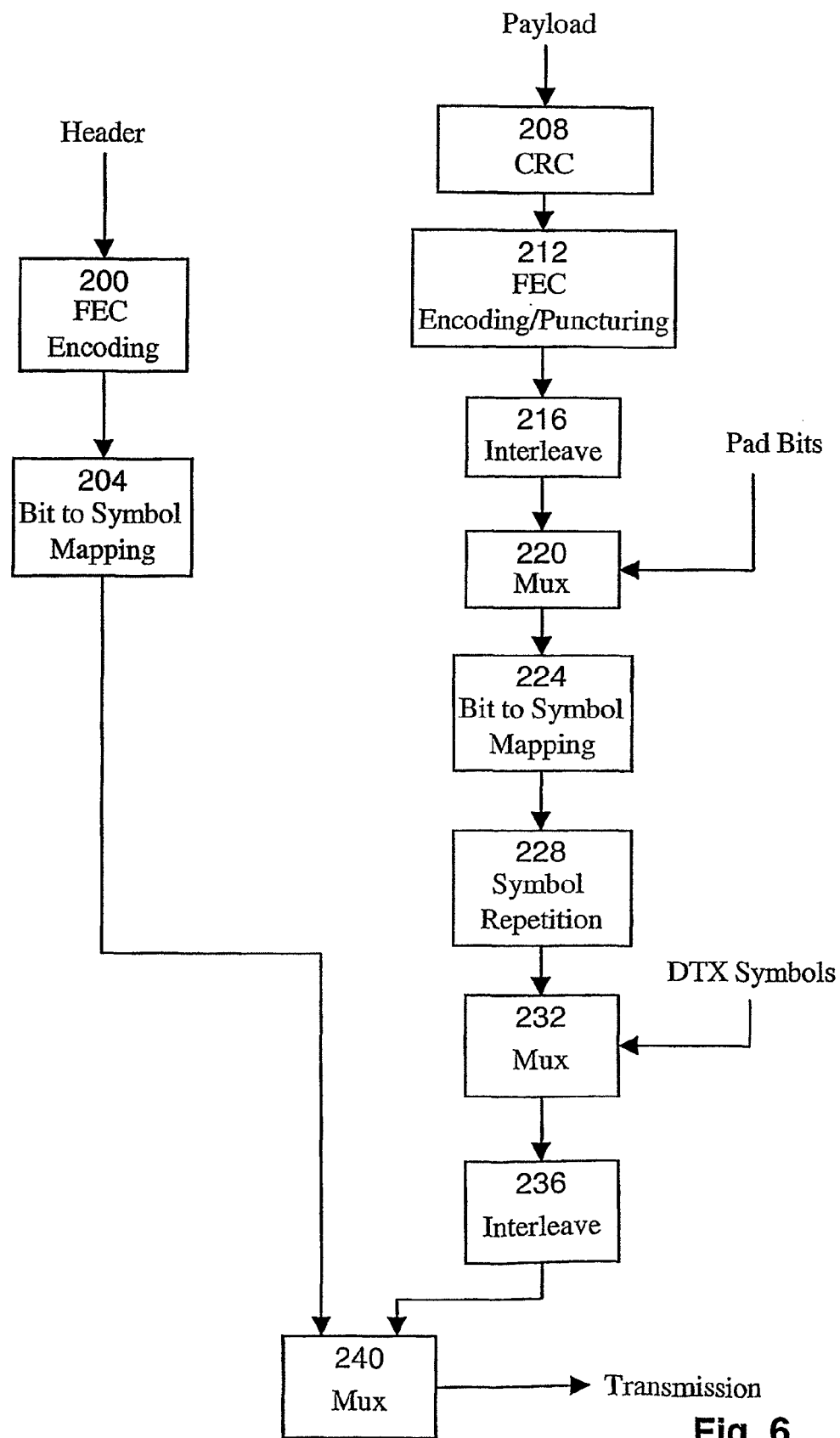
FIG. 6 is a flowchart of a method of constructing the block of FIG. 5.

FIG. 6 shows a flowchart of the process of constructing a block B for transmission. As shown, the ten information bits of header information are first FEC encoded at 200 to yield thirty encoded bits for a rate ⅓ FEC code. In the present embodiment of the invention, a second order Reed-Muller coder is employed, although other suitable coders will also occur to those of skill in the art, which also performs a symbol repetition of order eight to obtain two-hundred and forty encoded bits. Next, the encoded bits are mapped to appropriate symbols for transmission at 204 and, in the present embodiment of the invention, QPSK modulation is employed so that the two-hundred and forty encoded bits are mapped to one-hundred and twenty traffic symbols for transmission.

While processing of the payload bits can be performed after processing of the header bits has been completed, in a presently preferred embodiment of the invention, the payload bits are processed in parallel with the processing of the header bits to reduce processing latency.

As shown in the Figure, a cyclical redundancy check (CRC) value is first calculated for the payload information bits at 208 and this value is included, with the payload information bits, as part of the bits to be transmitted. In a present embodiment of the invention, this CRC value is determined from the systematic code generated by a $g_{CRC16}(D)$ function which produces a sixteen bit CRC code, although other suitable CRC functions will be apparent to those of skill in the art.

Next, the information bits and the CRC bits are FEC encoded at 212 and, in a present embodiment of the invention, this is accomplished with a Turbo coder with subsequent puncturing of the code. As mentioned above, the degree to which the resulting code is punctured is selected according to the reception quality of the intended recipient of the block B which is being constructed. At 216, the resulting bits are interleaved using a Relative Prime Interleaver in a present embodiment of the invention.

After this coding and interleaving, the bits are mapped to symbols at 224, according to the selected M-ary modulation scheme, where M can be four, sixteen or sixty-four (i.e., 4-QAM, 16-QAM or 64-QAM). Again, the modulation scheme employed is selected according to the reception quality of the intended recipient of the block B being constructed. If the number of bits to be mapped is not divisible by $\log_2(M)$, then symbol rate pad bits are added at 220 to fill the available bit space before the symbol mapping at 224.

Next, symbol repetition is performed at 228 at the desired repetition rate, if any. In a present embodiment of the invention, repetition is performed on a symbol by symbol basis, e.g.—given a sequence of bits $s_1, s_2, s_3, s_4$ and repetition rate of two, the resulting sequence will be $s_1, s_1, s_2, s_2, s_3, s_3, s_4, s_4$.

At this point, if the number of symbols to be transmitted are less than the number of traffic symbols available for payload 108, in this specific embodiment of the invention one thousand and eighty traffic symbols, then DTx padding symbols are appended to the channel symbols at 232. Finally, the channels symbols and the appended DTx padding symbols, if any, are interleaved using a Relative Prime Interleaver at 236 and the resulting traffic symbols are placed in block B at 240, after the header bits (which are not interleaved, i.e.—header bits always appear at the beginning of block B). The resulting block B can then be processed by the physical channel processes for transmission.

In operation, each subscriber station 28 reports its reception quality to base station 24. In an embodiment of the present invention, a subscriber station 24 reports to base station 40 the signal to noise ratio and/or the frame error rate at which it receives frames 100 of channel 32. This reporting can be performed at an appropriate interval selected by the operator of system 20, as a trade-off exists between the frequency of the reporting, the relevancy/accuracy of the last reported information and the use of the transmission resources between subscriber station 28 and base station 24 for reporting this information.

Reception of a block B at a subscriber station follows an inverse set of operations, as will be apparent to those of skill in the art. It should be noted that de-interleaving of traffic symbols can be performed in parallel with the decoding of the header bits, to reduce overall latency at the receiver.

As mentioned above, header 104 is always packaged into block B in a robust manner to provide a relatively high level of confidence of recovery by all subscriber stations 28a, 28b ... 28n when frame 100 is transmitted over channel 32. Such robust packaging is intended to allow every subscriber station 28 served by base station 24 to recover header 104. Every subscriber station 28 attempts to decode every block B that it receives, even though the payload 108 may be packaged such that a receiving subscriber station 28 will not normally be able to recover it. In such a case, the CRC code which was included in payload 108 at 208 will be incorrect and the subscriber station 28 will discard the block B. If that block B was intended for the subscriber station, a higher level of the protocol stack employed in system 20 will be responsible for retransmitting the data of that payload 108 to the subscriber station 28 in a subsequent block B.

The payload 108 of a block B can be any type of data received at base station 24. For example, payload 108 can be one or more TCP/IP packets, or part of a segmented packet, where it is desired to transmit IP packets to a subscriber station 28. Payloads 108 can be specifically addressed to a particular subscriber stations 28a, 28b ... or 28n, each of which has its own unique address and/or one or more broadcast addresses can be defined for subscriber stations with similar reception qualities. Alternatively, broadcast packets can be packaged for the worst reception quality expected for all of the intended receivers. Data in payload 108 can be combined or segmented, as needed, to fit the size restrictions on the payload in a block B.

As data is received by base station 24 for transmission to one or more subscriber stations 28, the data is buffered until a sufficient amount of data is received to fill a frame 100 or until a predefined maximum wait time is exceeded. As will now be apparent to those of skill in the art, the amount of data which is sufficient to fill a frame 100 is dependent upon the Block Format selected to construct each block $B_i$ in a frame 100. It is contemplated that different blocks $B_i$ within a frame 100 will often have different Block Formats as they are intended for different receivers. Thus, the determination of the receipt of a sufficient amount of data is made assuming the best (i.e., most data rate efficient) encoding and modulation operations, or when the predefined maximum wait time has expired from the receipt of the earliest data, this latter parameter being employed to ensure that a frame 100 is assembled and transmitted before a preselected maximum latency period is exceeded. Any received data which cannot be placed into the assembled frame 100, due to the Block Format being less data rate efficient, is buffered and assembled in due course into the next frame 100 to be assembled.

When a sufficient amount of data is received to fill frame 100, including any data which was buffered from the previous frame 100, the reception quality last reported by each intended receiver is used to select an appropriate Block Format for each block B which are then assembled and inserted into frame 100.

The now-assembled frame 100 is transmitted over channel 32 to subscriber stations 28a, 28b ... 28n. The transmission can occur in the usual manner, using known techniques.

It is contemplated that system 20 can include more than one channel 32 if desired. In such a case, each channel 32 can have the same spreading factor, or different spreading factors can be employed for different channels 32. For example, one channel 32 can have a spreading factor of four, to enhance, for a given transmission power level, the likelihood of reception at subscriber stations with poor reception qualities while other channels 32 can have spreading factors of eight, sixteen, etc., to provide efficient data transmissions to subscriber stations with better reception qualities.

It is to be understood by those of skill in the art that modifications can be made to the above-described method without departing from the present invention. For example, different numbers of header bits, different frame durations, different chip rates, etc., can be employed.

While the embodiments discussed herein are directed to multiple-access schemes conducted over wireless physical links and using CDMA as a multiple access technique, it will be understood that the present invention can be applied to a variety of physical links, such as over twisted-pair or coaxial links, and a variety of multiple-access schemes such as TDMA, FDMA, OFDM or CDMA.

The present invention provides a novel data channel in a network having at least one base station and a plurality of subscriber stations. The data channel can be composed of a plurality of frames having a number of data blocks, each having the same number of traffic symbols. The headers of each block are robustly packaged in any appropriate manner, to ensure and/or assist all receivers to recover the header information with a high probability of success (low probability of Frame Error) and the payload of the block is packaged in a manner which is efficient for the intended receiver, as determined from that receiver's reported reception quality.

The above-described embodiments of the invention are intended to be examples of the present invention and alterations and modifications may be effected thereto, by those of skill in the art, without departing from the scope of the invention which is defined solely by the claims appended hereto.

I claim:

1. A system for transmitting data comprising:
a base station operable to transmit a radio signal to a plurality of subscriber stations, the signal including frames each having a same fixed duration and each comprising a plurality of data blocks, each data block including a header and a corresponding payload portion having a length, wherein each header includes information required to recover the corresponding payload portion;
wherein the base station is arranged and configured to:
receive reports intermittently from each of the plurality of subscriber stations regarding the reception quality of the subscriber stations;
package each data block individually for transmission to an intended subscriber station,
package each payload portion of each data block in a manner that is, for the intended subscriber station, a data rate efficient combination as determined according to a reception quality reported by the intended recipient subscriber station, and
package the corresponding header of each data block in a manner that is determined in accordance with an intention that the header be receivable by all subscriber stations that have at least a predetermined minimum reception quality.

2. The system of claim 1 wherein each data block contains a same preselected number of traffic symbols.

3. The system of claim 2, wherein the base station, in packaging data into a data block for transmission, processes header bits and payload information bits separately from each other and in parallel, the header formed by first applying forward error correction coding to the header bits and then mapping the header bits onto traffic symbols, and the payload portion formed by calculating a cyclic redundancy check (CRC) value for the payload information bits, applying forward error correction coding to the payload information bits and bits of the CRC value to produce coded bits, interleaving the coded bits to produce interleaved bits, mapping the interleaved bits into symbols using an M-ary modulation scheme while adding padding bits if the number of bits to be mapped is not divisible by $\log_2(M)$, applying symbol repetition to the resulting symbols, padding the result of the symbol repetition with discontinuous transmission (DTx) padding symbols if necessary for the data block to contain the preselected number of traffic symbols, and interleaving the resulting traffic symbols.

4. The system of claim 1 wherein the header of each data block includes a portion indicating the packaging employed for the corresponding payload portion and a portion indicating a length of the corresponding payload portion.

5. The system of claim 1 wherein the packaging employed for each payload portion includes a combination of forward error correction coding, modulation, and traffic symbol repetition rate.

6. The system of claim 1, wherein the base station is further configured to receive from each subscriber station reports of its reception quality at agreed intervals.

7. The system of claim 1, wherein the payload portion of each data block includes an identification of the intended recipient subscriber station.

8. A method for transmitting data from a base station to a plurality of subscriber stations using a radio signal, the radio signal including frames each having a same fixed duration and comprising a plurality of data blocks, each data block including a header and a corresponding payload portion having a length, the header including information required to recover the corresponding payload portion, and the method comprising:
receiving intermittent reports from each of the plurality of subscriber stations, each report including a reception quality of the respective subscriber station; and
packaging each data block individually for transmission to an intended recipient subscriber station including
packaging each payload portion in a manner that is a data rate efficient combination as determined according to a reception quality reported by the intended recipient subscriber station, and
packaging each header in a manner that is determined in accordance with an intention that the header be receivable by all subscriber stations that have at least a predetermined minimum reception quality.

9. The method of claim 8 wherein each data block contains a same preselected number of traffic symbols.

10. The method of claim 9, wherein the step of packaging each data block individually for transmission further comprises processing header bits and payload information bits separately from each other and in parallel, the header being formed by first applying forward error correction coding to the header bits and then mapping the header bits onto traffic symbols, and the payload portion being formed by calculating a cyclic redundancy check (CRC) value for the payload information bits, applying forward error correction coding to the payload information bits and bits of the CRC value to produce coded bits, interleaving the coded bits to produce interleaved bits, mapping the interleaved bits into symbols using an M-ary modulation scheme while adding padding bits if the number of bits to be mapped is not divisible by $\log_2(M)$, applying symbol repetition to the resulting symbols, padding the result of the symbol repetition with discontinuous transmission (DTx) padding symbols if necessary for the data block to contain the preselected number of traffic symbols, and interleaving the resulting traffic symbols.

11. The method of claim 8 wherein the header of each data block includes a portion indicating the packaging employed for the corresponding payload portion and a portion indicating a length of the corresponding payload portion.

12. The method of claim 8 wherein packaging each payload portion includes applying a combination of forward error correction coding, modulation, and traffic symbol repetition rate to that payload portion.

13. The method of claim 8, wherein the step of receiving intermittent reports further comprises receiving the intermittent reports at predetermined intervals.

14. The method of claim 8, wherein the payload portion of each data block includes an identification of the intended recipient subscriber station.

* * * * *